United States Patent
Scriffignano et al.

(10) Patent No.: US 8,438,183 B2
(45) Date of Patent: May 7, 2013

(54) ASCRIBING ACTIONABLE ATTRIBUTES TO DATA THAT DESCRIBES A PERSONAL IDENTITY

(75) Inventors: Anthony J. Scriffignano, West Caldwell, NJ (US); Michael Klein, Chatham, NJ (US)

(73) Assignee: The Dun & Bradstreet Corporation, Short Hills, NJ (US)

( * ) Notice: Subject to any disclaimer, the term of this patent is extended or adjusted under 35 U.S.C. 154(b) by 0 days.

(21) Appl. No.: 13/087,067

(22) Filed: Apr. 14, 2011

(65) Prior Publication Data

US 2011/0258232 A1    Oct. 20, 2011

Related U.S. Application Data

(60) Provisional application No. 61/324,086, filed on Apr. 14, 2010.

(51) Int. Cl.
*G06F 7/30* (2006.01)

(52) U.S. Cl.
USPC .......................................... 707/780; 707/769

(58) Field of Classification Search .................. 707/780, 707/999.003, 999.005
See application file for complete search history.

(56) References Cited

U.S. PATENT DOCUMENTS

| | | | | |
|---|---|---|---|---|
| 7,467,232 | B2 * | 12/2008 | Fish et al. | 709/246 |
| 7,895,223 | B2 * | 2/2011 | Toebes | 707/758 |
| 8,086,620 | B2 * | 12/2011 | Parikh et al. | 707/765 |
| 2006/0015498 | A1 * | 1/2006 | Sarmiento et al. | 707/6 |
| 2007/0005686 | A1 * | 1/2007 | Fish et al. | 709/203 |
| 2008/0033939 | A1 * | 2/2008 | Khandelwal | 707/5 |
| 2008/0109875 | A1 | 5/2008 | Kraft | |
| 2008/2174000 | | 9/2008 | Portano | |
| 2009/0055355 | A1 | 2/2009 | Brunner et al. | |
| 2009/0070323 | A1 * | 3/2009 | Parikh et al. | 707/5 |
| 2009/0228482 | A1 * | 9/2009 | Ye | 707/5 |
| 2009/0271374 | A1 * | 10/2009 | Korn et al. | 707/3 |
| 2010/0023509 | A1 * | 1/2010 | Adachi et al. | 707/5 |

OTHER PUBLICATIONS

International Search Report and Written Opinion dated Jun. 13, 2011 based on corresponding PCT Application No. PCT/US11/32517.
International Preliminary Report on Patentability dated Jun. 7, 2012 corresponding to International Patent Application No. PCT/US11/32517.

\* cited by examiner

*Primary Examiner* — Miranda Le
(74) *Attorney, Agent, or Firm* — Ohlandt, Greeley, Ruggiero & Perle, LLP.

(57) ABSTRACT

There is provided a method that includes (a) receiving an inquiry to initiate a search for data for a specific individual, (b) determining, based on the inquiry, a strategy and flexible predictiveness equations to search a reference database, (c) searching the reference database, in accordance with the strategy, for a match to the inquiry; and (d) outputting the match. The method may also output flexible feedback related to the match that reflects inferred quality of the match experience which can be used by an end-user to determine the degree to which the matched entity meets that end-user's quality-based criteria. There is also provided a system that performs the method, and a storage medium that contains instructions that control a processor to perform the method.

3 Claims, 2 Drawing Sheets

ASCRIBING ACTIONABLE ATTRIBUTES TO DATA THAT DESCRIBES A PERSONAL IDENTITY

CORRESPONDING APPLICATION

This application claims priority to U.S. Provisional Application No. 61/324,086, filed Apr. 14, 2010, which is incorporated herein by reference thereto in its entirety.

BACKGROUND OF THE INVENTION

1. Field of the Invention

The present disclosure relates to database searching, and more particularly, searching for a record in a database that best matches a given inquiry related to personal identity that may include both expected and unexpected data attributes, and retrieving the record that best matches the inquiry along with actionable feedback that explains the match experience and result.

2. Description of the Related Art

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Efficient database access and searching capabilities are important for effective utilization of data that is maintained in referential databases for matching purposes. Crucial to this objective is an ability to enable efficient retrieval of a match result, i.e., a result of matching reference data to an inquiry that includes personal indicia both anticipated as part of the inquiry as well as previously unknown indicia, to identify and select match results in an efficient and effective manner, and to provide actionable feedback that can be used to make business decisions regarding the use of the match results such as for ongoing effective data stewardship.

Specific to identifying an individual, existing technology considers a specific and finite number of data fields such as given names, surnames, physical and email addresses, titles, and aliases, or a set of undefined data components that may or may not include information related to an individual. This existing technology is generally based on character-for-character or mathematical heuristic comparisons, which yield opinions of accuracy based on a number of characters matched or other basic correlative information, after accounting for allowable orthographic variations, such as multiple ways of spelling a specific word, as well as the use of hyphenation, capitalization, word-breaks, punctuation, known abbreviations, and synonyms. In addition, the existing technology assumes a specific structure of inquiry data, and does not allow for a finite but temporally unbounded collection of high-value, predictive data elements or other derived indicia, associated to an individual, and that have been validated and synthesized or aggregated into a database of individuals, to be used through the match process.

SUMMARY OF THE INVENTION

There is provided a method that includes (a) receiving an inquiry to initiate a search for data for a specific individual, (b) determining, based on the inquiry, a strategy to search a reference database, (c) searching the reference database, in accordance with the strategy, for a match to the inquiry; and (d) outputting the match. The method may also provide feedback related to the match that reflects inferred quality of the match which can be used by an end-user to determine the degree to which the matched entity meets that end-user's quality-based criteria. There is also provided a system that performs the method, and a storage medium that contains instructions that control a processor to perform the method.

Inquiries are handled in order to recognize and synthesize inquiry indicia, including both expected and unexpected data components, in order to evaluate and select candidates. Reference data regarding individuals is maintained on a database, accessed, evaluated and utilized to identify matches for an inquiry. A match result and actionable data is provided to an inquirer or an inquiring system, including confidence indicators that describe a relative strength of the match result and attributes to indicate feedback on data and alternative indicia that was used to propagate the match.

DESCRIPTION OF THE INVENTION

Indicia are information that relate to the identity of an individual. Indicia include recognizable attributes of an inquiry, that is, data components that are expected components of the inquiry, such as name of an individual, address, and date of birth, or which are specifically defined in an inquiry, e.g., as metadata via column headers on a file or specific data entry fields in an online application, which can be used with other data to uniquely identify an individual. Indicia may also include attributes that have not previously been encountered, and alternative ways in which data values can be expressed or inferred such as alternative spellings of names.

Feedback is information about a match that reflects inferred quality of the match experience in terms of confidence in the degree of match between the inquiry and a match candidate, a comparative rating of each data field used in the match experience, and an indication as to a source of the data that was used to match to the inquiry. The feedback can be used by the end-user to determine the degree to which the matched entity meets that end-user's quality-based criteria, and for driving disparate actions and stewardship interventions based on that feedback.

Figure 1:
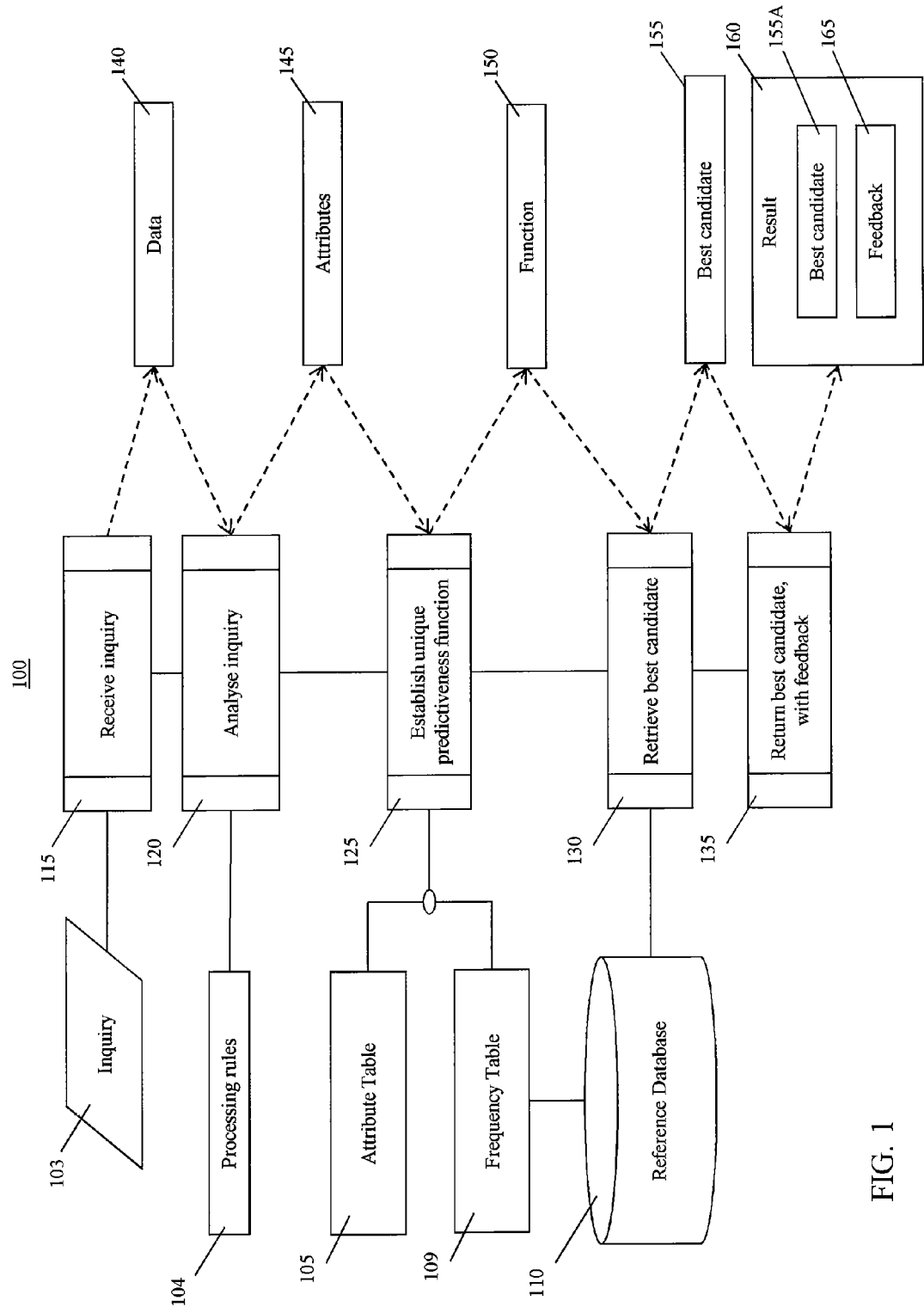
FIG. 1 is a functional block diagram of a method that ascribes actionable attributes to personal identity data.

FIG. 1 is a functional block diagram of a method 100 that ascribes actionable attributes to personal identity data. In brief, method 100 receives an inquiry 103, and executes processes 115, 120, 125, 130 and 135 to match data from inquiry 103 to data in a reference database 110, and thus yield a result 160.

Method 100 utilizes processing rules 104, an attribute table 105, and a frequency table 109, and in interim steps, produces data 140, attributes 145, a function 150, and a best candidate 155.

Each of processes 115, 120, 125, 130 and 135 is described herein with regard to their respective general operations. Each of processes 115, 120, 125, 130 and 135 may be configured as a stand-alone process or as a hierarchy of subordinate processes.

Inquiry 103 is a request that initiates a search for information about a specific individual. The search is based on indicia that are included in inquiry 103, and in this regard, inquiry 103 includes a plurality of data elements that, in turn, include specific information regarding the individual in terms of data fields that are all, or a subset of previously defined recognizable attributes as defined in processing rules 104 and attribute table 105, and could also potentially include additional and virtually unlimited indicia regarding the individual. Inquiry 103 can be provided to method 100 by a human user or by an automated process. For example, inquiry 103 may be derived from an individual inquiry processed using online data entry screens, or from files submitted using batch machine capabilities. Inquiry 103 includes data that method 100 reformats as data 140, and that method 100 will use to uniquely identify the individual. Data 140 may include, for example, data such as name, address, birth date, social security number, and other forms of identification.

Reference database 110 is a database of information about individuals with a maximal degree of personal and professional information, i.e., known attributes, regarding each individual. Processes (not shown) are used to qualify data that is then populated in reference database 110, which is then available for matching purposes. Through a set of additional processes (not shown), reference database 110 can be updated to include more information about an individual that is already represented in reference database 110, and to include information about additional individuals.

Processing rules 104 include automated and repeatable business and metadata rules (heretofore referred to as "rules") based on standardization and normalization processes that include semantic and numeric disambiguation logic to interpret inquiry values such as various word combinations (first name/middle name/last name or last name/first name/middle name, as well as various manipulations such as other re-orderings of attributes including all or a subset of name attributes), addressing (separate address or commingled address components), and different date formats. Metadata rules define information about each data element, such as (a) whether it is alpha, i.e., letters of the alphabet, numeric, or alphanumeric, i.e., either or both of alpha and numeric, (b) allowable size, and (c) formatting. Business processing rules define activities that occur based on the value of one or more data elements, e.g., a condition that must be met before a subsequent operation or calculation can be performed.

An example of standardization processes in processing rules 104 includes replacing different versions of street names, such as "St." and "Strt" with a common and consistent value such as "street". An example of normalization processes in processing rules 104 includes substituting common words or abbreviations such as "manufacturing" and "mnfc-tring" with "mnf" as a consistent term to facilitate matching. An example of semantic and disambiguation logic includes separating a street address into separate fields for street number and street name.

Attribute table 105 is a table of recognizable attributes, i.e., data fields, that could be associated to data that can identify an individual. Attribute table 105 also includes metadata that defines characteristics of the recognizable attributes. Metadata is information about data, that is, it describes characteristics of the data. For example, attribute table 105 may list an attribute of "first name", and may include metadata about the first name that indicates that the first name must be a string of alpha characters. Attribute table 105 can also be updated with data from data 140 to include attributes that have not previously been recognized, to which predictive weighting and other information can be defined. Values in attribute table 105 will be monitored and adjusted when updates are made to reference database 110.

Frequency table 109 indicates the numbers of records in reference database 110 that have particular values for particular attributes. That is, frequency table 109 is generated from reference database 110 to identify the frequency (F) of occurrence of specific data values in reference database 110. For example, reference database 110 may have 5,647 occurrences of "Jon" as a first name, 893 occurrences of "Smythe" as a last name, and 197 occurrences of "Jon Smythe" as a first/last name combination. Accordingly, frequency table 109 would indicate (a) first name "Jon" has a frequency of 5,647, (b) last name "Smythe" has a frequency of 893, and (c) first/last name combination has a frequency of "Jon Smythe"=197. Frequency table 109 is updated when records are updated in reference database 110.

Method 100 commences with process 115.

Process 115 receives inquiry 103, and structures indicia from inquiry 103 into a common format, i.e., data 140. Table 1, below, shows an exemplary representation of data 140. In Table 1, data 140 is shown with an exemplary set of data elements presented in an exemplary common format of expected inquiry values such as name, address, city, state, postal code, and phone number.

TABLE 1

Exemplary Representation of Data 140

| Activity | Exemplary Representation of Data 140 |
| --- | --- |
| Process 115 received inquiry 103, which included indicia expressed as separate data elements or data fields that provide specific information regarding an individual, and produced data 140. | Jon Smythe, President<br>350 Sixth Ave Suite 7712<br>Manhattan, NY 10118A<br>(917) 555-5555<br>01271960<br>123-456-7890<br>jsmith@abc.com<br>www.abcllc.com |

From process 115, method 100 progresses to process 120.

Process 120 analyzes data 140 to identify specific data fields that are associated to attributes in attribute table 105 in order to enhance the opportunity to identify matches from reference database 110 by using those data fields singularly or in pluralities. In this regard, process 120 extracts, from data 140, attributes that are relevant to a search for the match, thus yielding attributes 145.

Process 120 operates in accordance with processing rules 104 to cleanse, parse and standardize all components of the inputted inquiry data values as expressed in data 140.

Cleansing involves removing extraneous values such as punctuation and other forms of non-valuable characters, for example dashes in a phone number or slashes that separate components of a date. For example, cleansing a date value that is formatted as Jan. 27, 1960 would result in a value 012760.

Parsing includes partitioning data 140 to increase the opportunity to identify matches to inquiry 103. This may include parsing individual inquiry indicia into multiple data elements, for example, splitting a birthdate of 012760 which is in the format MMDDYY into separate elements that include month (MM (01)), day (DD (27)), and year (YY (60)). Parsing may also include merging separate elements, for example, first name (John), secondary name or initial (Q), and last name (Public) into one element, e.g., name (JohnQ-Public).

Standardizing includes associating alternative values to data 140 in order to increase the opportunity to identify matches. This may include associating a two-character value (NJ) for a series of inquiry values that represent state name (New Jersey; N Jersey; New Jrsy).

Process 120 also uses processing rules 104 to analyze and retain information from data 140 that was not previously encountered, in order to generate new rules that will be stored in processing rules 104 for use during a future execution of process 120. The new rules may be automatically defined based on similarities to existing rules. Thus, indicia that are included in data 140 but not defined in attribute table 105, i.e., additional indicia, will be retained for subsequent use by processes 120 and 125, and potentially used by processes 130 and 135 to process candidates as identified from reference database 110. Method 100 includes an automated capability to retain these additional indicia in order to develop and define attributes that would be populated in attribute table 105, and develop related rules that would be populated in processing rules 104.

Thus, process 120 analyzes data 140, and if process 120 recognizes an absence of a rule in processing rules 104 for some particular data, that particular data is stored on processing rules 104 and tagged for analysis. For example, if inquiry 103 contains an email address, and if an email address is a previously unrecognized value and as such has no corresponding rule in processing rules 104, processing rules 104 may be updated by an updating process (not shown) to retain the email as a new indicia, which may become a recognized attribute.

Below, Table 2 shows an exemplary representation of processing rules 104, and Table 3 shows an exemplary representation of attributes 145. Examples of processing rules 104 include (i) dividing data 140 name field into separate first and last name fields, (ii) dividing data 140 address field into separate street number and street name fields, and (iii) dividing data 140 date-of-birth field into separate month, day, and year fields. Flexible indicia includes data from data 140 that was not previously identified as data anticipated to be part of an inquiry, but which should be retained by processing rules 104 for future match experiences. This includes both data that can be categorized based on templates and freeform data.

TABLE 2

Exemplary Representation of Processing Rules 104

| Rule | Exemplary result |
|---|---|
| Metadata rules (examples) | |
| Name: parse full inquiry name into separate first and last name values, and remove extraneous values | First name: Jon<br>Last name: Smythe |
| Address: parse all inquiry address values into separate values, standardize value for "city", and cleanse postal code | Street address number: 350<br>Street address name: Sixth Ave<br>Alternative street address name: 6$^{th}$ (determined based on alternative logic within processing rules 104)<br>Address2: Suite 7712<br>Alternative address2: 7$^{th}$ floor (determined based on alternative logic within processing rules 104)<br>City: New York (replaces "Manhattan" which is not a city)<br>State: NY<br>Postal code: 10118 (remove "A" as assumed extraneous data) |
| Business rules (example) | |
| Date of Birth (DOB): parse full date-of-birth value into separate day, month, year values, standardize for processing Flexible indicia | DOB/MM: 01<br>DOB/DD: 27<br>DOB/YY: 60 |
| Assumed values based on format | Email: jsmith@abc.com |

TABLE 3

Exemplary Representation of Attributes 145

| Attribute | Value |
|---|---|
| Recognizable attributes | |
| First name | Jon |
| Last name | Smythe |
| Street address number | 350 |
| Street address name | Sixth Ave |
| Address2 | Suite 7712 |
| City | New York |
| State | NY |
| Postal code | 10118 |
| Phone | (917) 555-5555 |
| DOB/MM | 01 |
| DOB/DD | 27 |
| DOB/YY | 60 |
| Mobile Phone Number | 1234567890 |
| Flexible indicia | |
| Email | jsmith@abc.com |
| Title | President |
| Company Uniform Resource Locator (URL) | www.abcllc.com |

For example, according to Table 2, processing rules 104 indicates that a name is to be parsed into separate first and last name values. Thus, "Jon Smythe" is parsed to yield a first name "Jon" and a last name "Smythe", and stored as shown in Table 3.

Method 100 progresses from process 120 to process 125.

Process 125 interfaces with attribute table 105 to further characterize attributes 145, to develop function 150. For each attribute in attributes 145, process 125 assigns a weight based on a relative value of impact of the attribute in identifying an individual, thus yielding a weighted attribute, where the weight is indicative of a usefulness of the attribute in finding a match to data 140. For example, this determination would include weighting as defined by attribute table 105 which provides a static weighting, e.g., name has a higher weight than address, and weighting relative to other populated fields as defined by attribute table 105, e.g., employment-start-date has more value when it is at least 18 years greater than date-of-birth, as well as weighting based on the actual data value of a field as defined in attribute table 105, e.g., an unusual name such as Erasmus has greater weight than a more common name such as John. This analysis also considers alternative values for data fields in attributes 145 such as acronyms and alternative spellings (for example, Jon and Jonathan as a first name). In addition to static weighting by attribute, attribute table 105 assigns adjusted weightings based on the absence or presence of data values for other attributes and inferred predictiveness. For example, the weight of a first name has less value if there is no data for last name, and the combination of street number and name has more weight than the two fields separately.

Process 125 determines an optimal strategy to search reference database 110, and represents that strategy in function 150, represented herein as f(x). More specifically, process 125 obtains weight (W) from attribute table 105 and frequency (F) from frequency table 109, calculates a predictive weighting (K), where $K=W \times F$, for each attribute (x), thus yielding K(x), where K(x) is the predictive weighting of attribute x. Function 150 may calculate multiple values of f(x) based on different combinations of attributes, for example last name and DOB or first/last name and DOB, the results of which are used by process 125 to determine the optimal search strategy. Function 150 has the following general format:

$$f(x)=K_1<\text{field1}>+K_2<\text{field2}>+K_3<\text{field3}>+\ldots+K_N<\text{fieldN}>,$$

where K is computed for each component of attributes 145.

Below, Table 4 shows an exemplary representation of attribute table 105, and Table 5 shows an exemplary representation of frequency table 109.

TABLE 4

| Attribute | Metadata | Weight (W) |
|---|---|---|
| Recognizable attributes: | | |
| First name | alpha | 0.25 |
| Last name | alpha | 0.5 |
| Street address number | alphanumeric | 0.4 |
| Street address name | alpha | 0.8 |
| Address2 | alphanumeric | 0.25 |
| City | alpha | 0.9 |
| State | alpha | 0.9 |
| Postal code | alphanumeric | 0.75 |
| Phone | numeric | 0.5 |
| DOB/MM | numeric | 0.3 |
| DOB/DD | numeric | 0.2 |
| DOB/YY | numeric | 0.5 |
| Mobile Phone Number | numeric | 1 |
| Flexible indicia | | |
| Email | alphanumeric | 1 |
| Title: | alphanumeric | 0.2 |
| Company URL | alphanumeric | 0.7 |
| Combinations of attributes | | |
| First/last name | alpha | 0.9 |
| DOB/MMDDYY | numeric | 0.7 |

In the example in Table 4, attribute table 105 includes an attribute "first name", metadata that specifies that the first name must be a string of alpha characters, and for the first name, a weight (W)=0.25. Values of weight (W) indicate the relative impact of attributes in inquiry 103 as expressed in data 140 identifying a match from reference database 110. In the example presented in Table 4, when an attribute has a value of W=1, that attribute is considered to be a better predictor of a match than an attribute with a value of W that is less than 1. For example, if inquiry 103 includes a personal mobile phone number, which is an attribute with a value that can be considered to be unique, the personal mobile phone number would have more impact on the match experience than a last name, which is likely to have a value that is more common.

TABLE 5

Exemplary Representation
of Frequency Table 109

| Attribute | Frequency (F) |
|---|---|
| First Name = Jon | 5,647 |
| Last Name = Smythe | 893 |
| First/Last Name = Jon Smythe | 197 |
| . . . | . . . |
| DOB = 012760 | 211 |
| Mobile Phone Number = 1234567890 | 1 |

In process 125, the determination of predictive weighting may consider a relationship across attributes, and calculate a modified weight based on such relationship. For example, while a first name and last name will have their own predictive weightings, the combination of that first and last name may be more predictive or less predictive in identifying an appropriate match in reference database 110. For example, there may be more frequent occurrences of a combined first and last name value of "Jon Smith" in reference database 110 as defined in frequency table 109 than of "Erasmus Haled". The combined first name/last name value may have a frequency (F), as defined in frequency table 109, to indicate a more predictive weighting or a less predictive weighting.

As noted above, for each attribute (x), process 125 obtains weight (W) from attribute table 105 and frequency (F) from frequency table 109, and calculates a predictive weighting (K), where K=W×F. Multiple predictive weighting values can be calculated based on different combinations of attributes. For example, using the exemplary data in Table 4 and Table 5 for one calculation of f(x):

For first name=Jon, K1=0.25×5,647=1411.75
For last name=Smythe, K2=0.5×893=446.5
Accordingly, f(x), i.e., function 150, for first and last name is:
f(x)=1411.75<first name "Jon">+446.5<last name "Smythe>

Using the exemplary data in Table 4 and Table 5 for a second calculation of f(x):

For first/last name=Jon Smyth, K1=0.9×197=177.3
For DOB/MMDDYY=012760, K2=0.7×211=147.7
Accordingly, f(x), i.e., function 150, for first/last name and DOB/MMDDYY is:
f(x)=177.3<first/last name "Jon Smythe">+147.7<DOB/MMDDYY "012760">

Generally, for a given attribute, weight (W) is greater if the attribute is a good predictor of a match, but frequency (F) being greater suggests that the attribute is not a good predictor of a match. Let's consider an example of a search for an individual that has a common first name, such as "John", but a unique mobile phone number, such as "1234567890", and accordingly, in frequency table 109, for first name "John", (F)=10,000, and for mobile phone number "1234567890", (F)=1. The predictive weighting (K), where K=W×F, for these attributes, based on Table 4, is K<first name "John">=0.25×10,000=2500, and K<mobile phone number "1234567890">=1×1=1. Thus, it appears that in f(x), first name "John" has a greater predictive weighting than mobile phone number "1234567890". However, based on the actual logic that is executed, the lower f(x) may be more predictive than the higher f(x).

Although in the present example function 150 is represented as a summation of products, function 150 is not necessarily a summation or an arithmetic equation. Generally, function 150 is a listing of weighted attributes, where the weight of a particular attribute or combinations of attributes is indicative of the predictiveness, and therefore the importance, of that attribute or combinations of attributes in identifying an appropriate match to a record in reference database 110.

Method 100 progresses from process 125 to process 130.

Process 130 searches reference database 110 in accordance with function 150, i.e., the strategy that was determined by process 125, and produces best candidate 155. More specifically, process 130 retrieves records from reference database 110 in accordance with function 150. Process 130 then compares attributes from those records with data 140, and based on the comparison, selects from reference database 110 a set of candidates that are likely matches to data 140. Thereafter, process 130 evaluates the set of candidates by comparing the value of each attribute from the retrieved records in reference database 110 with the value of the same attribute from data 140 to ultimately determine a best match candidate, i.e., best candidate 155.

Table 6, below, shows an exemplary representation of a set of candidates from reference database 110.

TABLE 6

Exemplary Set of Candidates from Reference Database 110

| Record Number | Field | Value |
|---|---|---|
| 1 | First name | Jonathan |
|   | Last name | Smith |
|   | Street address number | 350 |
|   | Street address name | 6th Ave |
|   | Address2 | (null) |
|   | City | New York |
|   | State | NY |
|   | Postal code | 10118 |
|   | Phone | (null) |
|   | DOB/MM | (null) |
|   | DOB/DD | (null) |
|   | DOB/YY | 50 |
|   | Mobile Phone Number | 1234567890 |
| 2 | First name | John |
|   | Last name | Smarth |
|   | Street address number | 340 |
|   | Street address name | 5th Ave |
|   | Address2 | 7$^{th}$ floor |
|   | City | New York |
|   | State | NY |
|   | Postal code | 10118 |
|   | Phone | (917) 555-5000 |
|   | DOB/MM | (null) |
|   | DOB/DD | (null) |
|   | DOB/YY | (null) |
|   | Mobile Phone Number | (null) |

Best candidate 155 is a record from the set of candidates that has the most similarity with data 140, resulting from techniques within process 130 to winnow the set of candidates. Such techniques include considering the source of data that populated reference database 110, and quality-related inferences regarding that data (if some sources are considered to be more current and higher-quality than other sources).

For example, for record 1 in Table 6, process 130 compares data values for attribute "last name" from data 140 ("Smythe") and reference database 110 ("Smith") and determines a high degree of similarity, as well as for attribute "street address name" which is "Sixth Ave" in data 140 and "6$^{th}$ Ave" in reference database 110. For record 2 in Table 6, process 130 compares data values for attribute "last name" from data 140 ("Smythe") and reference database 110 ("SmithSmarth") and determines a lesser degree of similarity, and for attribute "street address name" process 130 determines no level of similarity between "Sixth Ave" in data 140 and "5$^{th}$ Ave" in reference database 110.

Table 7, below, shows an exemplary representation of best candidate 155.

TABLE 7

Exemplary Representation of Best Candidate 155

| Attribute | Value |
|---|---|
| First name | Jonathan |
| Last name | Smith |
| Street address number | 350 |
| Street address name | 6th Ave |
| Address2 | (null) |
| City | New York |
| State | NY |
| Postal code | 10118 |
| Phone | (null) |

TABLE 7-continued

Exemplary Representation of Best Candidate 155

| Attribute | Value |
|---|---|
| DOB/MM | (null) |
| DOB/DD | (null) |
| DOB/YY | 50 |
| Mobile Phone Number | 1234567890 |

Method 100 progresses from process 130 to process 135.

Process 135 outputs result 160, which includes best candidate 155A and feedback 165. Best candidate 155A is a copy of best candidate 155. Feedback 165 is information regarding a degree of similarity between data 140 and best candidate 155A that is actionable, i.e., it can be used by an end-user to make business decisions.

Feedback 165 is included with result 160 to indicate the quality of best candidate 155A, e.g., a level of confidence that best candidate 155A is an appropriate match to inquiry 103. Feedback 165 may also include a relative degree of similarity as expressed by a relative correlation between each field in data 140 and each component of best candidate 155A. This feedback is expressed in three components: (1) Confidence Code, which indicates the relative degree of confidence in similarity between data 140 and candidates in reference database 110; (2) Match Grade String, which indicates the degree of similarity between attributes of data 140 and candidates in reference database 110; and (3) Match Data Profile which indicates the type of data in reference database 110 that was used in the match experience. These feedback components can be used by an end-user to define business rules to drive the use and consumption of personal identity matches for that end-user to make commercial decisions regarding the match experience based on the degree to which the matched entity meets that end-user's quality-based criteria and for ongoing stewardship interventions. These feedback structures can be flexible, mirroring the incidence and inception of flexible indicia in inquiry 103. Additional capabilities may be provided to the user to browse and review data for inquiries that could not be matched.

Table 8, below, shows an exemplary representation of feedback 165.

TABLE 8

Exemplary Representation of Feedback 165

| Confidence Code: | 8 |
|---|---|
| Match Grade String: | |
| First name: | A |
| Last name: | A |
| Street address number: | B |
| Street address name: | A |
| Address2: | Z |
| City: | A |
| Postal Code: | B |
| State: | A |
| Telephone: | Z |
| DOB: | F |
| Mobile Phone Number: | A |
| Match Data Profile: | |
| First name: | 03 |
| Last name: | 03 |
| Street address number: | 00 |
| Street address name: | 00 |
| Address2: | 99 |

TABLE 8-continued

Exemplary Representation
of Feedback 165

| | |
|---|---|
| City: | 00 |
| Postal Code: | 00 |
| State: | 00 |
| Telephone: | 98 |
| DOB: | 98 |
| Mobile Phone Number: | 00 |

Match Grade String feedback may be defined using a coding structure as follows: "A" means data for a match candidate from reference database 110 should be considered to be the same as data in data 140 (e.g., Jon and John); "B" means there is some similarity between data 140 and a record from reference database 110 (e.g., Jon and Jhonny); "F" means data for a match candidate in reference database 110 should not be considered to be the same as data in data 140 (e.g., Jon and Jim); "Z" means there was no value for a data field in data 140 or in reference database 110 for a specific data field.

Match Data Profile feedback indicates the type of data in reference database 110 that was used by process 130 to match a record from reference database 110 to data 140, and may be defined using a coding structure such as "00" to mean primary business name or address, "03" to mean alternative values such as Chief Executive Officer (CEO) or former names or addresses, "98" to indicate an attribute from data 140 that was not used by process 130, or "99" to indicate that an attribute that was not populated in data 140.

Thus, in brief, method 100 includes 1) receiving an inquiry to initiate a search for a specific individual, 2) processing the inquiry to maximize the use of each inquiry data field individually and in conjunction with other inquiry data fields including processes to cleanse, parse and standardize the inquiry, 3) determining optimal methods to search a reference database based on single or a plurality of cleansed, parsed, and standardized inquiry values, 4) candidate retrieval to select reference database entities that match the inquiry, and 5) returning the best candidate and providing feedback including match results with actionable attributes.

Method 100 includes steps to 1) receive input data comprising a plurality of elements, 2) convert a subset of the plurality of elements to a set of terms, 3) infer predictiveness of the ability to identify a match candidate using flexible indicia based on an end-user inquiry including both data that is expected as part an inquiry and alternative data that may be provided by the end-user, 4) retrieve stored reference data based on the terms to identify most likely candidates for match to the input data, 5) select a best match from the plurality of match candidates based on the inferred predictiveness, and 6) provide match results with actionable attributes, determined by the unique aspects of each initiating inquiry and the resulting candidate, that allow the end-user to make business decisions regarding the use of the match candidate.

Method 100 includes functionality to identify individuals using finite but temporally unbounded set of indicia that can be used to form an opinion of similarity between an inquiry and match candidates. Method 100 addresses certain inherent problems in uniquely identifying an individual including 1) commonality of personal names relating to different discrete individuals, which is more prevalent than with businesses, 2) a specific name without additional indicia which can be associated to an individual as well as a business, or to more than one individual or business, and 3) individuals that are often associated to multiple addresses and physical locations or other indicia. By extending a flexible and variable set of identification and match attributes to an individual, these challenges can be addressed. The flexibility of the technique includes both metadata and actual data values, and would be used in both 1) populating a database with information related to individuals, as well as 2) selecting an individual from the database based on an inquiry and rules governing the threshold of acceptance for given purposes.

In method 100, a set of indicia is first defined such that $X_1$, $X_2$, ... $X_n$ represent the attributes to be used for matching (e.g., First Name, Second Name, Surname, Known address elements, other descriptive information). This set of indicia is extensible with no restriction on size, and all reference data would be used in the matching, selection, and evaluation process. The reference data is constructed to contain as large a set of data as possible so as to include all expected values of X and additional inferred or derived data based on equations and predictive algorithms.

For each match iteration, the inquiry set is interrogated to determine S, a subset of the set X. Based on a set of correlation coefficients determined in the larger set X at the time of the match or other predetermined predictive interval, matching is performed and feedback is returned as (1) a confidence interval describing how strong the match is as modified by the correlation coefficients in X and the observed subset S in use for the inquiry set, (2) a match grade string indicative of the relative elements of S and the quality of match in those particular elements, and (3) a match profile string indicating what reference data was used to form an opinion regarding the quality of the match, i.e., an opinion regarding a level of confidence that the best candidate is an appropriate match to the inquiry. Both the match grade string and the match profile string can be flexible in length and format, as determined by the data components that are used in the match process.

Figure 2:
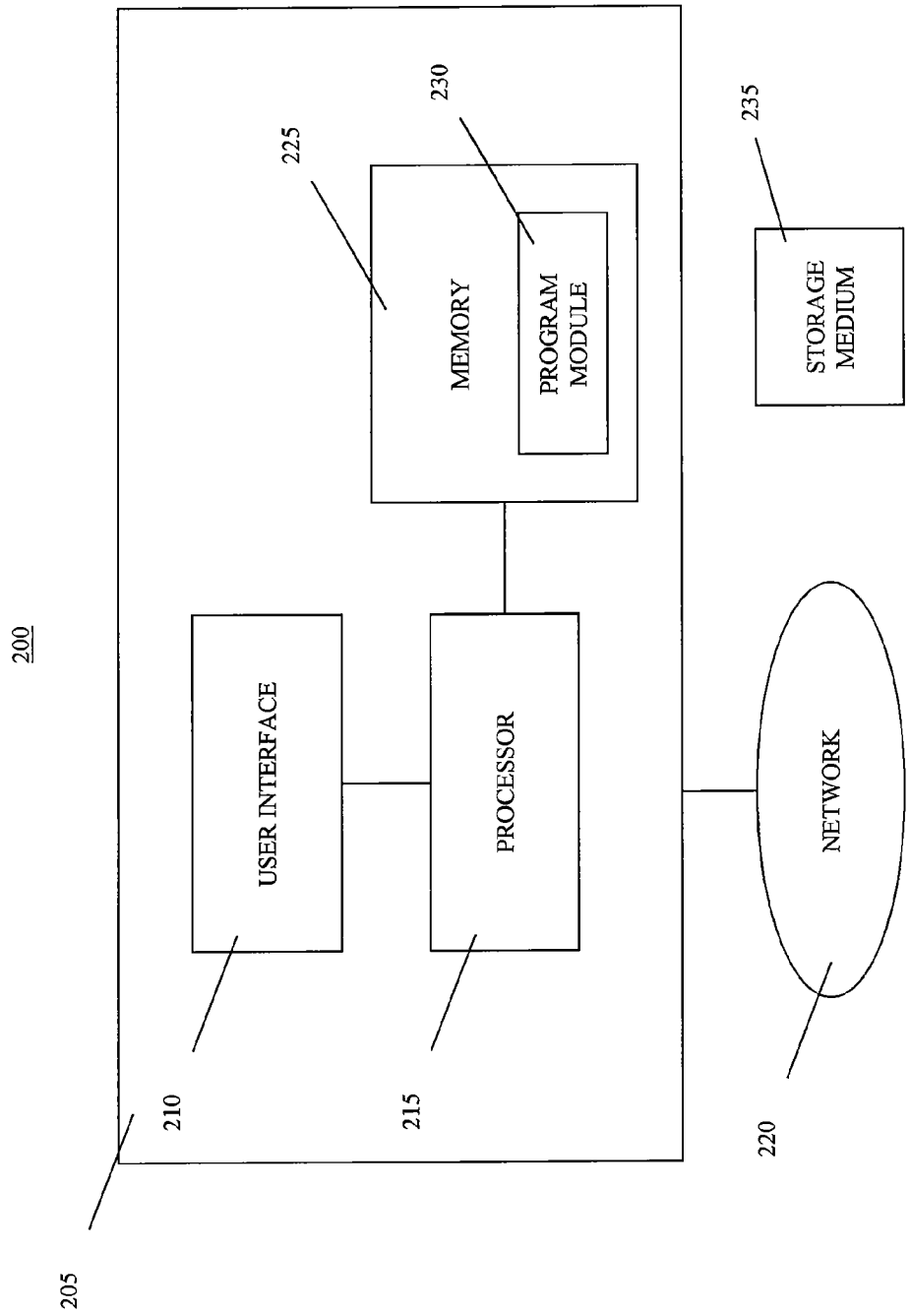
FIG. 2 is a block diagram of a system for employment of the present invention.

FIG. 2 is a block diagram of a system 200, for employment of the present invention. System 200 includes a computer 205 coupled to a data communications network, i.e. network 220, such as the Internet.

Computer 205 includes a user interface 210, a processor 215, and a memory 225. Although computer 205 is represented herein as a standalone device, it is not limited to such, but instead can be coupled to other devices (not shown) in a distributed processing system.

User interface 210 includes an input device, such as a keyboard or speech recognition subsystem, for enabling a user to communicate information and command selections to processor 215. User interface 210 also includes an output device such as a display or a printer. A cursor control such as a mouse, track-ball, joy stick, or a touch-sensitive material situated on the display, allows the user to manipulate a cursor on the display for communicating additional information and command selections to processor 215.

Processor 215 is an electronic device configured of logic circuitry that responds to and executes instructions.

Memory 225 is a non-transitory computer-readable medium encoded with a computer program. In this regard, memory 225 stores data and instructions that are readable and executable by processor 215 for controlling the operation of processor 215. Memory 225 may be implemented in a random access memory (RAM), a hard drive, a read only memory (ROM), or a combination thereof. One of the components of memory 225 is a program module 230.

Program module 230 contains instructions for controlling processor 215 to execute the methods described herein. For example, under control of program module 230, processor 215 executes the processes of method 100. The term "module" is used herein to denote a functional operation that may be embodied either as a stand-alone component or as an integrated configuration of a plurality of sub-ordinate components. Thus, program module 230 may be implemented as a single module or as a plurality of modules that operate in cooperation with one another. Moreover, although program module 230 is described herein as being installed in memory 225, and therefore being implemented in software, it could be implemented in any of hardware (e.g., electronic circuitry), firmware, software, or a combination thereof.

Processor 215 receives inquiry 103, either through network 220 or user interface 210, and accesses processing rules 104, attribute table 105 and reference database 110. Processing rules 104, attribute table 105, and reference database 110 can be components of computer 205, for example, stored within memory 225, or can be located on devices external to computer 205, where computer 205 accesses them via network 220. Processor 215 outputs result 160 to user interface 210 or to a remote device (not shown) via network 220.

While program module 230 is indicated as already loaded into memory 225, it may be configured on a storage medium 235 for subsequent loading into memory 225. Storage medium 235 is also a non-transitory computer-readable medium encoded with a computer program, and can be any conventional storage medium that stores program module 225 thereon in tangible form. Examples of storage medium 235 include a floppy disk, a compact disk, a magnetic tape, a read only memory, an optical storage media, universal serial bus (USB) flash drive, a digital versatile disc, or a zip drive. Storage medium 235 can also be a random access memory, or other type of electronic storage, located on a remote storage system and coupled to computer 205 via network 220.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

What is claimed is:

1. A method comprising:
    receiving an inquiry to initiate a search for data concerning a specific individual;
    determining, based on said inquiry, a strategy to search a reference database;
    searching said reference database, in accordance with said strategy, for a match to said inquiry;
    outputting said match: and
    outputting an indicator of a level of confidence that said match is an appropriate match to said inquiry, wherein said indicator indicates what reference data was used to form an opinion regarding said level of confidence,
    wherein said determining said strategy comprises:
        extracting, from said inquiry, an attribute that is relevant to said searching;
        assigning a weight to said attribute, thus yielding a weighted attribute, wherein said weight is indicative of a usefulness of said attribute in finding a match to said inquiry; and
        establishing a function, based on said weighted attribute,
    wherein said searching comprises:
        retrieving from said reference database, candidates having attribute values that indicate likely matches to said inquiry, based on said function;
        determining a best candidate from said candidates; and
        returning said best candidate as said match,
    wherein said inquiry includes an inquiry value for said attribute, and
    wherein said establishing comprises:
        modifying said weight as a function of a number of records in said reference database that have said inquiry value for said attribute.

2. A system comprising:
    a processor; and
    a memory that contains instructions that, when read by said processor, cause said processor to:
        receive an inquiry to initiate a search for data concerning a specific individual;
        determine, based on said inquiry, a strategy to search a reference database;
        search said reference database, in accordance with said strategy, for a match to said inquiry; and
        output said match,
    wherein to determine said strategy, said instructions cause said processor to:
        extract, from said inquiry, an attribute that is relevant to said search;
        assign a weight to said attribute, thus yielding a weighted attribute, wherein said weight is indicative of a usefulness of said attribute in finding a match to said inquiry; and
        establish a function, based on said weighted attribute,
    wherein to search said reference database, said instructions cause said processor to:
        retrieve from said reference database, candidates having attribute values that indicate likely matches to said inquiry, based on said function;
        determine a best candidate from said candidates; and
        return said best candidate as said match,
    wherein said inquiry includes an inquiry value for said attribute,
    wherein to establish said function, said instructions cause said processor to:
        modify said weight as a function of a number of records in said reference database that have said inquiry value for said attribute,
    wherein said instructions also cause said processor to output an indicator of a level of confidence that said match is an appropriate match to said inquiry, and
    wherein said indicator indicates what reference data was used to form an opinion regarding said level of confidence.

3. A storage medium, comprising instructions that, when read by said processor, cause said processor to:
    receive an inquiry to initiate a search for data concerning a specific individual;
    determine, based on said inquiry, a strategy to search a reference database;
    search said reference database, in accordance with said strategy, for a match to said inquiry; and
    output said match,
    wherein to determine said strategy, said instructions cause said processor to:
        extract, from said inquiry, an attribute that is relevant to said search;

assign a weight to said attribute, thus yielding a weighted attribute, wherein said weight is indicative of a usefulness of said attribute in finding a match to said inquiry; and
establish a function, based on said weighted attribute,
wherein to search said reference database, said instructions cause said processor to:
retrieve from said reference database, candidates having attribute values that indicate likely matches to said inquiry, based on said function;
determine a best candidate from said candidates; and
return said best candidate as said match,
wherein said inquiry includes an inquiry value for said attribute,
wherein to establish said function, said instructions cause said processor to:
modify said weight as a function of a number of records in said reference database that have said inquiry value for said attribute,
wherein said instructions also cause said processor to output an indicator of a level of confidence that said match is an appropriate match to said inquiry, and
wherein said indicator indicates what reference data was used to form an opinion regarding said level of confidence.

* * * * *